3,819,714
PROCESS FOR PREPARING 2,5-HEXANEDIONE
Henry Bluestone, University Heights, and Edmond R. Osgood, Mentor, Ohio, assignors to Diamond Shamrock Corporation, Cleveland, Ohio
No Drawing. Filed Sept. 15, 1972, Ser. No. 289,489
Int. Cl. C07c 45/18
U.S. Cl. 260—595         6 Claims

ABSTRACT OF THE DISCLOSURE 2,5-Hexanedione is prepared by hydrolysis of the lactone of alpha-acetyl-gamma-cyano-gamma-hydroxyvaleric acid in the presence of alkali and with the inclusion of ferrous sulfate which complexes the hydrocyanic acid by-product formed during the hydrolysis, thus preventing its further reaction with and degradation of the diketone product.

BACKGROUND OF THE INVENTION

This invention relates to the preparation of 2,5-hexanedione, an important intermediate in organic synthesis reactions and more particularly relates to an improved method for preparing this compound in commercially practical yields from the lactone of alpha-acetyl-gamma-cyano-gamma-hydroxyvaleric acid.

The preparation of 2,5-hexanedione, or acetonyl-acetone, via a multi-stage process in which monochloroacetone and potassium cyanide are initially reacted has been described by Romeo Justoni in Gazz. Chim. Ital., 71, pp. 41–53 and 375–388 (1941). From the reaction of monochloroacetone and the cyanide in an alkaline medium, one obtains 2,4-dicyano-5-hydroxy-2,5-dimethyltetrahydrofuran and/or 4-carbamyl-2-cyano-2,5-dimethyl-2,3-dihydrofuran. This product, in turn, may be reacted with, e.g., sulfuric or hydrochloric acid to yield the lactone of alpha-acetyl-gamma-cyano-gamma-hydroxyvaleric acid. The desired 2,5-hexanedione product may then be obtained by hydrolyzing this lactone with alkali, e.g., NaOH, normally obtaining as final by-products, sodium cyanide and carbon dioxide.

Practice of the hydrolysis procedure according to Justoni, however, has provided only low yields of the desired 2,5-hexanedione product. Hydrolysis of the lactone employing in place of sodium hydroxide other aqueous bases such as sodium carbonate, potassium carbonate, sodium bicarbonate or ammonium hydroxide likewise has provided only low yields of the product, i.e., up to 50% by weight of the lactone charge. An improved method for hydrolyzing the lactone of alpha-acetyl-gamma-cyano-gamma-hydroxyvaleric acid is desirable whereby greater, commercially practical yields of 2,5-hexanedione may be consistently obtained.

SUMMARY OF THE INVENTION

We have now found that by hydrolyzing the lactone of alpha-acetyl-gamma-cyano-gamma-hydroxyvaleric acid with an aqueous base such as sodium carbonate, potassium carbonate and the like in the presence of a source of the $Fe^{++}$ ion, as, e.g., ferrous sulfate, up to 90% of the theoretical yields of stable 2,5-hexanedione product are obtained.

DESCRIPTION OF THE PREFERRED EMBODIMENTS

As described previously herein, it is known to prepare 2,5-hexanedione by hydrolyzing the lactone of alpha-acetyl-gamma-cyano-gamma-hydroxyvaleric acid with an equimolar quantity of aqueous base (50% NaOH) as follows:

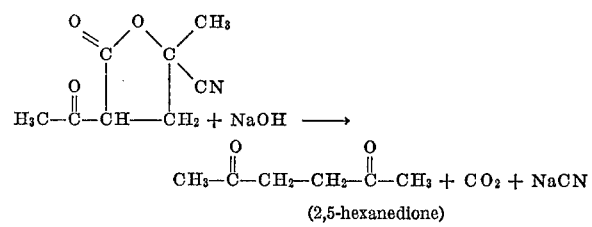

(2,5-hexanedione)

In this reaction, the lactone upon hydrolysis, is first converted to its cyanohydrin which, in turn, is cleaved in the presence of alkali and converted to alpha-acetonylacetoacetic acid, by splitting off hydrocyanic acid (HCN). The acetonylacetoacetic acid then easily decarboxylates into 2,5-hexanedione and carbon dioxide ($CO_2$), while the HCN reacts with sodium hydroxide to form sodium cyanide.

In aqueous solution at moderately elevated temperatures and especially in the presence of $CO_2$, however, the sodium cyanide rapidly decomposes, evolving free HCN. The free acid then acts upon and degrades the 2,5-hexanedione product significantly reducing the overall yield of this product.

The preparation of the lactone reactant itself is effected by first condensing monochloroacetone with sodium cyanide and then hydrolyzing the resulting cyclic product, 2,4 - dicyano - 5 - hydroxy-2,5-dimethyltetrahydrofuran and/or 4-carbamyl - 2 - cyano-2,5-dimethyl-2,3-dihydrofuran through the action of hydrochloric acid. These reactions and the resulting products have been extensively discussed in the previously described Justoni article and form no part of the present invention.

The present invention comprises hydrolyzing the lactone of alpha-acetyl-gamma-cyano-gamma-hydroxyvaleric acid with aqueous alkali generally by procedures now known in the art, with the exception that the reaction is carried out in the presence of a compound which provides the $Fe^{++}$ ion, ferrous sulfate in particular being preferably used at present as the source of this ion. For this reason and because of its ready availability and low cost, specific mention will be made hereinafter to ferrous sulfate.

During the process of this invention, as the HCN is evolved, the $Fe^{++}$ ion providing compound, e.g., ferrous sulfate, serves to scavenge this by-product. It reacts with the cyanide radical of the acid, forming a stable complex, the ferrocyanide ion, thus making HCN unavailable for further reaction with and degradation of the diketone product.

The quantity of ferrous sulfate satisfactorily employed in the process herein may vary generally from about 0.05 mole to about 0.75 mole per mole of lactone reactant. The quantity of alkali, e.g., sodium carbonate, potassium carbonate, and the like, which suitably may be used, varies generally from about 0.2 mole to 2 moles per mole of lactone. Use of greater quantities of alkali will usually cause excessive foaming in the reaction mixture. More particularly, quantities of ferrous sulfate which range from about 0.15 mole to 0.60 mole, and still more particularly, from about 0.30 mole to 0.50 mole in combination with amounts of alkali ranging from about 0.5 mole to 1 mole per mole of lactone are found to provide optimum yields of the desired 2,5-hexanedione product while simultaneously stabilizing the product most effectively against any significant degradation even during prolonged reaction times.

The process of this invention may generally be conducted at a temperature ranging from about 40° to 100°

C. The rate of the reaction appears to be pH sensitive so that the reaction time within the stated temperature range generally will vary from about 1 hour to about greater than 6 hours, (i.e., 6⅓ hours, as shown in Example 1) depending upon the quantity of ferrous sulfate used and also upon the ratio of ferrous sulfate to alkali employed.

The order of addition of the reactants is not especially critical. However, it is preferred to add the ferrous sulfate at the beginning of the reaction to most effectively utilize its scavenging ability.

Upon completion of the reaction, the reaction mixture is cooled to room temperature and the hexanedione isolated therefrom by solvent extraction. Suitable solvents for this purpose are, for example, toluene, ethyl acetate, chloroform, or tetrachloroethylene. Alternatively, the hexanedione product may in some instances be employed without isolation to prepare other organic compounds, as for example, a 2,5-dimethylpyrrole. In this procedure, after the hexanedione preparatory reaction has been completed, the reaction mixture is cooled to about 40° C. Gaseous ammonia is then bubbled into the reaction mixture until the resulting exotherm ceases. The dimethyl-pyrrole product separates from the aqueous phase and is isolated therefrom. It is finally purified by distillation.

The process of this invention provides an economical, easily-practiced method for preparing commercially feasible yields of 2,5-hexanedione from the lactone of alpha-acetyl-gamma-cyano-gamma-hydroxyvaleric acid, particularly since the scavenger employed, ferrous sulfate, is inexpensive and easily obtained.

Also, the process of this invention yields as a by-product a stable ferrocyanide salt which is nontoxic and presents no difficult disposal and/or pollution problems. In contrast, toxic, polluting chemicals are obtained from the process, if no ferrous sulfate is employed.

For a fuller understanding of the nature of this invention, and the manner for carrying it out, the following examples are given. These are intended to illustrate the invention and are not to be construed in the limiting sense. All quantities, proportions, and percentages given in the examples are by weight unless otherwise indicated.

EXAMPLE 1

A. Preparation of the Lactone of Alpha-Acetyl-Gamma-Cyano-Gamma-Hydroxyvaleric Acid To a 200-ml. three-necked flask equipped with a stirrer, thermometer, condenser, dropping funnel, and heating mantle is charged 73 ml. of water. With agitation, 24.1 g. (0.145 m.) of crude 2,4-dicyano-5-hydroxy-2,5-dimethyltetrahydrofuran and/or 4-carbamyl - 2 - cyano-2,5-dimethyl-2,3-dihydrofuran (m.p.=177–9° C.) is added to the flask. To the resulting slurry, 12.4 ml. of concentrated HCl is quickly added, after which the reaction mixture is agitated for 15–30 minutes at a controlled temperature of 30° C. The reaction mixture is then cooled to 15° C. and the solid product is isolated, washed with cold water and air dried. The product which is recovered in 99% yield has a melting point of 71–2° C. and is determined to contain approximately 98% of the desired lactone product by vapor phase chromatography.

B. Preparation of 2,5-Hexanedione

Anhydrous sodium carbonate (3.2 g.-0.03 m.) is dissolved in 60 ml. of water in the reaction flask. Then added are 3.9 g. of dried ferrous sulfate containing 87% anhydrous ferrous sulfate (0.0223 m.) and 10.0 g. (0.059 m.) of the lacetone product of Part A above. The resulting slurry is stirred while being heated slowly to 71° C., during which time period some foaming occurs in the reaction mixture. The reaction temperature is then raised to 88° C. and the reaction is continued at this temperature for 6⅓ hours. Upon cooling, the reaction mixture is filtered and the percentage of 2,5-hexanedione product obtained is measured by vapor phase chromatography using a flame ionization detector and an external standard employing water as the solvent. Using this procedure, 2,5-hexanedione is obtained in 89% yield.

EXAMPLE 2–4

These examples illustrate the stabilizing effect of ferrous sulfate on the overall synthesis reaction even with extended reaction times, resulting in good practical yields of the 2,5-hexanedione product. A series of reactions are carried out according to the general procedure of Example 1(B), employing, per mole of the lactone reactant, varying molar concentrations of ferrous sulfate as shown in the following table. In these experiments, anhydrous sodium carbonate ($Na_2CO_3$) is employed as the base at a concentration of 0.5 mole per mole of the lactone. Results are as follows:

| | FeSO₄ (mole) | Reaction Temperature, ° C. | Reaction Time, minutes | Hexanedione yield, percent |
|---|---|---|---|---|
| Example: | | | | |
| 2 | 0.0635 | 68–73 | 110 | 75 |
| 3 | 0.127 | 77 | 135 | 76 |
| 4 | 0.264 | 80 | 170 | 77 |

These results indicate that with continued reaction, even at increased temperatures, degradation of the product is not effected when ferrous sulfate in the listed quantities is present in the reaction mixture. Employing a concentration of 0.380 mole of ferrous sulfate per mole of lactone at a temperature of 88° C. for 380 minutes (the reaction of Example 1) provides a total product yield of 89%.

These results are in contrast to those obtained by conducting the lactone hydrolysis in the absence of the ferrous sulfate. When a reaction is conducted at 69° C., as set forth in Example 2, but excluding this component, an aliquot of the reaction mixture is analyzed by vapor phase chromatography 70 minutes after the start of the reaction and is found to contain 64% of the hexanedione product. With continued reaction, however, periodic analysis of the reaction mixture shows incremental reduction of hexanedione content therein. For example, after carrying out the aforedescribed reaction for an additional 35–40 minutes, the reaction mixture is analyzed and found to contain about 12% less of hexanedione product than in the earlier analysis.

EXAMPLE 5

The reaction of Example 1 is repeated at 67° C. delaying addition of the ferrous sulfate (0.380 mole per mole of lactone) until one hour after the start of the reaction. The total reaction time is 310 minutes. The yield of hexanedione product obtained is 73% which is lower than obtained from the process of Example 1. This result indicates that ferrous sulfate is more effective for providing the best product yields when included initially in the reaction mixture.

EXAMPLE 6

A further reaction is carried out as set forth in Example 1, employing 1.0 mole instead of 0.5 mole of sodium carbonate per mole of lactone. Some foaming is observed during the reaction. After the foaming is continued for about 3 hours at 75° C., the reaction mixture is analyzed by vapor phase chromatography and is found to contain 73% 2,5-hexanedione product.

It is to be understood that although the invention has been described with specific reference to particular embodiments thereof, it is not to be so limited, since changes and alterations therein may be made which are within the full intended scope of this invention as defined by the appended claims.

We claim:

1. In a process for preparing 2,5-hexanedione by hydrolyzing the lactone of alpha-acetyl-gamma-cyano-gamma-hydroxyvaleric acid with aqueous alkali, the improvement which comprises conducting the hydrolysis reaction in the presence of ferrous sulfate, said reaction being conducted at a temperature of 40–100° C.

2. The process of claim 1 wherein the alkali compound is selected from the group consisting of sodium hydroxide, sodium carbonate, and potassium carbonate.

3. The process of claim 1 wherein from about 0.05 mole to about 0.75 mole of ferrous sulfate is employed per mole of the lactone reactant.

4. The process of claim 1 wherein from about 0.2 mole to 2 moles of alkali is employed per mole of the lactone reactant.

5. The process of claim 1 which is conducted for a time period of about 1 hour to 6⅓ hours.

6. The process of claim 1 wherein the ferrous sulfate is incorporated in the reaction mixture at the start of the reaction.

References Cited

Justoni, "Gazz. Chim. Ital.," vol. 71, pp. 41–53 and 375–388 (1941).

LEON ZITVER, Primary Examiner

J. H. REAMER, Assistant Examiner

U.S. Cl. X.R.

260—343.6